United States Patent
Funk et al.

(10) Patent No.: US 7,798,754 B2
(45) Date of Patent: Sep. 21, 2010

(54) UNITARY VOID FILLING APPARATUS FOR USE WITH VARIOUS PALLET SIZES AND LOADS, AND METHOD OF USING THE SAME

(75) Inventors: Lori H. Funk, Folsom, CA (US); Patrick M. Henley, Rancho Cordova, CA (US)

(73) Assignee: Sunrise Mfg, Inc., Rancho Cordova, CA (US)

(*) Notice: Subject to any disclaimer, the term of this patent is extended or adjusted under 35 U.S.C. 154(b) by 0 days.

(21) Appl. No.: 12/197,168

(22) Filed: Aug. 22, 2008

(65) Prior Publication Data

US 2010/0047032 A1 Feb. 25, 2010

(51) Int. Cl.
*B63B 25/22* (2006.01)
*B65D 65/00* (2006.01)
(52) U.S. Cl. .................. 410/155; 410/154; 410/98; 206/522
(58) Field of Classification Search ............. 410/96–99, 410/119–122, 154, 155; 160/135, 351; 206/523, 206/522, 586, 591–593
See application file for complete search history.

(56) References Cited

U.S. PATENT DOCUMENTS

| | | | | |
|---|---|---|---|---|
| 3,426,996 A | * | 2/1969 | Broling | 24/71 TD |
| 4,367,572 A | * | 1/1983 | Zielenski | 24/301 |
| 5,114,010 A | * | 5/1992 | Smith | 206/453 |
| 5,152,647 A | * | 10/1992 | Sewell | 410/154 |
| 5,678,968 A | | 10/1997 | Bourgeois et al. | |
| 5,741,098 A | | 4/1998 | Letts, III | |
| 6,050,761 A | * | 4/2000 | Keip et al. | 410/35 |
| 6,527,488 B2 | | 3/2003 | Elze et al. | |
| 6,540,080 B2 | * | 4/2003 | Moreyra | 206/523 |
| 6,685,021 B2 | * | 2/2004 | Dodson et al. | 206/443 |
| 7,066,698 B2 | | 6/2006 | Bullock | |
| 7,137,765 B1 | | 11/2006 | Elze et al. | |
| 7,290,969 B2 | | 11/2007 | Bullock | |
| 7,377,393 B2 | * | 5/2008 | Maresh et al. | 206/522 |
| 2007/0110536 A1 | | 5/2007 | Thomson et al. | |
| 2008/0073238 A1 | | 3/2008 | Liao et al. | |

* cited by examiner

*Primary Examiner*—Patricia L Engle
(74) *Attorney, Agent, or Firm*—Audrey A. Millemann; Weintraub Genshlea Chediak

(57) ABSTRACT

A unitary void filling apparatus for use as a lengthwise void spacer which is capable of preventing movement of a load disposed on a pallet, protecting the load from end-to-end forces, and acting as a dust cover. The apparatus consists of a frame folded to make a central area, which fits on top of the load, and two vertical sides, which hangs over opposite ends of the load. Attached to each vertical side are covered void fillers, each adapted to substantially fill any lengthwise underhang and protect the load from end-to-end forces. The central area of the frame supports the vertical sides to which the void fillers are attached, thereby holding the void fillers in the proper position and also preventing dust from accumulating on the cargo.

3 Claims, 1 Drawing Sheet

(Normal)

(Reverse)

UNITARY VOID FILLING APPARATUS FOR USE WITH VARIOUS PALLET SIZES AND LOADS, AND METHOD OF USING THE SAME

BACKGROUND

1. Field of the Inventions

The inventions relates to the field of structural dunnage devices used to protect and fill voids within cargo enclosures and methods of using the same. More particularly, the inventions pertain to an apparatus and methods that fill voids created between loaded pallets in the lengthwise direction and protect the load from end-to-end forces while also functioning as a dust cover.

2. Description of the Related Art

Prior to the present invention various forms of space fillers or cargo protectors have been used. U.S. Pat. No. 7,137,765 B1 to Elze et al. and U.S. Pat. No. 6,527,488 B2 to Elze et al. are composite dunnage bags containing an inner air bladder surrounded by a supportive shell specifically designed for placement between two parallel rows of cargo, preferably of distances greater than twelve inches, which are used as lengthwise void fillers. U.S. Pat. No. 5,678,968 to Bourgeois et al. describes a honeycomb roll spacer and U.S. Pat. No. 5,741,098 to Letts III describes a wedge dunnage device, and these patents serve the purpose of protecting and supporting cylindrical cargo loads. As is apparent, however, none of these inventions are directed to stabilizing a load in which there exists underhang gaps, particularly within a row of same-sized pallets that contain loads with substantially similar underhangs.

A prior solution to filling voids created by the underhang of load on pallets is stuffing various dunnage materials in between the load loaded on adjacent pallets. This solution is not effective, however, because the inserted material will not necessarily stay in the proper protective position, and also cannot be implemented efficiently, both during insertion and removal.

The invention described in U.S. Pat. Nos. 7,290,969 B2 and 7,066,698 B2 to Bullock utilize adhesive strips to hold cargo together. To effectively hold multiple units of cargo together, these inventions require the cargo to be in close proximity to each other and do not contemplate situations in which underhang space exists.

U.S. Pat. No. 5,152,647 to Sewell is directed to filling cross-wise voids and preventing overloading of axles on certain trailers.

SUMMARY

The present inventions relates to apparatus and methods of using structural dunnage devices used to protect and fill voids within cargo enclosures.

In one aspect the present invention provides a frame structure that fills voids created between loads loaded on pallets in the lengthwise direction and protects the loads from end-to-end forces while also functioning as a dust cover.

In other aspects, usage of the frame structures in different positional orientations to achieve different spacings to cover voids, as well as frame structures having void fillers attached thereto with thicknesses that are dependent on the number of frame structures used per loaded pallet are described.

BRIEF DESCRIPTION OF THE DRAWINGS

These and other aspects and features of the present inventions will become apparent to those of ordinary skill in the art upon review of the following description of specific embodiments of the invention in conjunction with the accompanying figures, wherein.

DETAILED DESCRIPTION OF THE PREFERRED EMBODIMENTS

Figure 1:
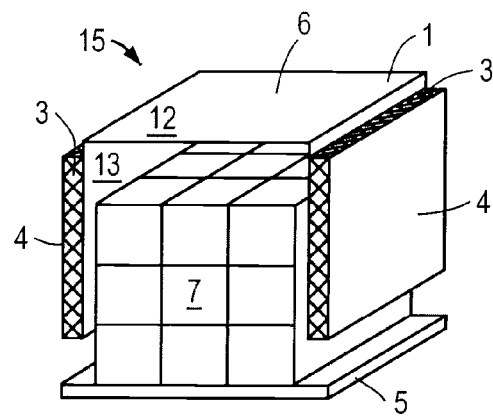
FIG. 1 is a perspective view of the apparatus over underhung cargo disposed on a pallet.
Figure 2:
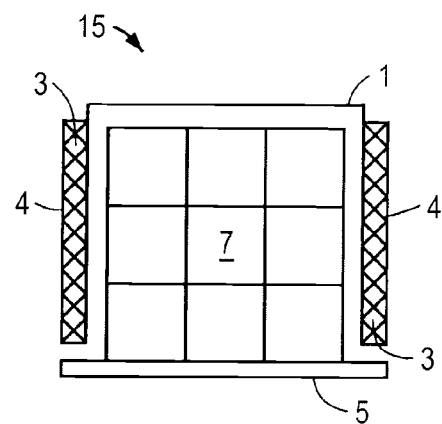
FIG. 2 is an end elevation view of the apparatus over underhung cargo disposed on a pallet.

FIG. 1 is a perspective view of the unitary void-filling apparatus 15 according to the present invention, in position over underhung load 7 disposed on a pallet 5, while FIG. 2 shows the same in elevation view. As shown, the unitary void-filling apparatus 15 includes a frame 1, preferably constructed from corrugated paperboard, in a manner well known in the art. Frame 1 is folded in two locations 10 to create a central area 12 and two vertical sides 13 on opposite ends of the central area 12. Attached to the two vertical sides 13, typically using a glue line as known, are void fillers 3, and disposed over each of the void fillers 3, in a preferred embodiment, is an optional corrugated cover 4, all of which are explained in more detail below. It is noted that the void fillers 3 are positioned in a manner such that they do not interfere with the two locations 10 for the fold that creates the central area 12.

The frame 1 dimensions are variable and can be designed as necessitated so the central area 12 fits over the load 7 with the vertical sides 13 covering the height of the load 7, which can vary from load to load. Loads are carried on pallets, and pallets 5, as are known, come in a variety of different dimensions, with the most common dimensions in the United States being 48"×40" typically used for grocery items, 42"×42" typically used for electrical equipment, paint, and the like, as well as 48"×48", typically used for drums and other loads. Almost all pallets, however, have 36" as a smallest dimension and 56" as a largest dimension. The embodiments described herein can be mass-produced for specific usage with multiple loads of a specific size disposed on a known pallet size, as well as configured for use with different sized pallets and loads, so that the same void filling apparatus 15 can be used with a variety of different pallet sizes, as discussed further hereinafter.

The inner surface (of the two vertical sides 13 of the frame 1 or the void fillers 3, or the corrugated covers 4, depending on usage as discussed herein), when in place, encompasses the load 7. The central area 12 of the frame 1 acts to hold the sides 13, as well as the attached void fillers 3, as well as the corrugated covers 4 if used, in the proper position and also protect the load 7 from dust accumulation. The two vertical sides 13 preferably hang all the way down to the pallet, though it is within the scope of the invention if they hang only partially down over the load 7 being covered.

Attached to frame 1 on both vertical sides 13 are void fillers 3, which each attach, at a bottom surface of the void filler 3, to one of the vertical sides 13. The void fillers 3 cushion the lengthwise ends of the load 7 from end-to-end forces when the load 7 is positioned in the transport vehicle, as described further hereinafter. The void fillers 3 consist of various materials, as described herein. In one embodiment, uniform honeycomb cells are used with a cell size that can vary. A preferred cell size is one that is in the range of 3-5.5 inches$^2$ or greater, with a preferred cell size being 3.75 inches$^2$ that is capable of withstanding end-to-end impacts of 1500 lbs/ft$^2$. Alternately, the void fillers 3 could be comprised of smaller honeycomb cells (typically having cell sizes in the range of 0.5-1.5 inches$^2$, built-up corrugated paperboard, as well as other paper, kraft paper, or foam mediums, and the like. The thickness of the void filler 3 is variable, with a preferred thickness being at least ¾ of an inch for larger honeycomb cells, and ⅜ of an inch for smaller honeycomb cells, and extending to thicknesses of three inches, six inches, or more depending on the usage. The particular thickness depends on many factors, including the size of underhang created when the load 7 is placed on the pallet 5.

The apparatus 15 also includes, in a preferred embodiment, corrugated covers 4, attached to a top surface of both void fillers 3, respectively, on the opposite side of the frame 1, preferably constructed of corrugated paperboard.

Figure 3:
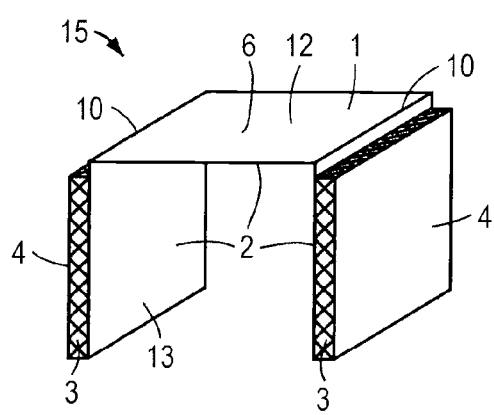
FIG. 3 is an end elevation view of the apparatus in original form.
Figure 4:
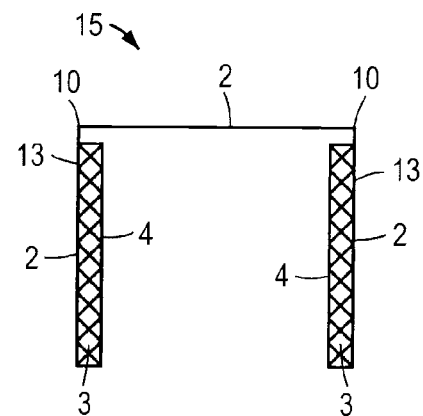
FIG. 4 is an end elevation view of the apparatus after being adjusted by reversing the frame.

FIG. 3 is an end elevation view of the void filling apparatus 15 in which the frame 1 forms the inner surface, whereas FIG. 4 is an end elevation view of the void filling apparatus 15 in which the frame 1 form the outer surface, obtained by reversing the frame, and which results in a narrower spacing for the inner surface (in this FIG. 4 embodiment then formed by the corrugated covers 4), as described herein. Specifically, reversing the frame 1 causes what had been the outer surface of the frame 1 to instead become the inner surface. Since the frame 1 is intended to have the vertical sides 13 hang vertically, reversing the frame to the FIG. 4 embodiment causes the corrugated cover 4 to become the inner surface, whereas the void fillers 3 are disposed inside the lengthwise dimension of the central area 12, rather than outside the lengthwise dimension of the central area 12 as in FIG. 3. This adjustment decreases the distance between the inner surface of the vertical sides by twice the thickness of one of the void fillers 3 and corrugated covers 4.

In use, a plurality of the void filling apparatuses 15 can each be placed over each of the loaded pallets, thereby creating covered loaded pallets, which can then be loaded onto a movable platform, such as a railway car or truck.

If the underhang of the loaded pallets is substantially similar for each of the loaded pallets, placing one of the void filling apparatuses over each loaded pallet will result in their being substantially no voids between adjacent loads in the longitudinal direction when placed in the movable platform. Thus, when loaded onto a movable platform, such as a railway car or truck, bumps from surfaces, starts and stops will not cause damage to the goods, as the longitudinal space between the loads is filled.

If the underhang is not substantially similar for the loaded pallets, the reversible feature of the void filling apparatuses 15 as discussed above can be used to eliminate to the greatest extent possible voids caused by the dissimilar underhangs.

In a modification of the above embodiments, the spacing of the void fillers 3 can be made to have a spacing of approximately double the underhang of the loaded pallets that each have a substantially similar underhand, such that only every other one of the loaded pallets have a void filling apparatus 15 disposed thereover, thus still resulting in the empty space between every adjacent pallet being filled.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. A method of loading onto a movable platform a plurality of loaded pallets, each loaded pallet having a load disposed on a pallet that is narrower than a length of the pallet, thereby creating an underhand thereon and a void corresponding thereto, the method comprising the steps of:
   providing a plurality of unitary void-filling apparatuses each for preventing movement of the load disposed on the pallet and withstanding end-to-end compression forces, each unitary void-filling apparatus comprising:
      a substantially rectangular corrugated frame having a first fold and a second fold thereby providing a central area and two substantially vertical sides on opposite ends of the central area;
      first and second void fillers each having a bottom surface attached to one of the two substantially vertical sides of the frame and a top surface, wherein the first and second void fillers are adapted to withstand the end-to-end compression forces;
   disposing said plurality of unitary void-filling apparatuses over at least some of said plurality of loaded pallets, thereby creating a plurality of covered loaded pallets;
   loading said plurality of loaded pallets, including said covered loaded pallets, onto the movable platform such that longitudinal voids between adjacent loaded pallets are filled;
   wherein the underhang is substantially similar for the plurality of loaded pallets, the step of providing provides first and second void fillers each having a thickness that is substantially double the substantially similar underhang; and
   wherein the step of disposing disposes one of said plurality of unitary void-filling apparatuses over every other loaded pallet, thereby completely filling all the longitudinal voids between adjacent loaded pallets.

2. A method of loading onto a movable platform a plurality of loaded pallets, each loaded pallet having a load disposed on a pallet that is narrower than a length of the pallet, thereby creating an underhang thereon and a void corresponding thereto, the method comprising the steps of:
   providing a plurality of unitary void-filling apparatuses each for preventing movement of the load disposed on the pallet and withstanding end-to-end compression forces, each unitary void-filling apparatus comprising:
      a substantially rectangular corrugated frame having a first fold and a second fold thereby providing a central area and two substantially vertical sides on opposite ends of the central area;
      first and second void fillers each having a bottom surface attached to one of the two substantially vertical sides of the frame and a top surface, wherein the first and second void fillers are adapted to withstand the end-to-end compression forces;
   disposing said plurality of unitary void-filling apparatuses over at least some of said plurality of loaded pallets, thereby creating a plurality of covered loaded pallets;
   loading said plurality of loaded pallets, including said covered loaded pallets, onto the movable platform such that longitudinal voids between adjacent loaded pallets are filled;
   wherein the underhang on different ones of the plurality of loaded pallets is dissimilar; and
   wherein the step of disposing disposes some of the unitary void-filling apparatuses so that for each of the some of the substantially rectangular corrugated frame is outside the first and second void fillers corresponding thereto relative to the loaded pallet, and disposes others of the unitary void-filling apparatus so that for each of the others of the substantially rectangular corrugated frame is inside the first and second void fillers corresponding thereto relative to the loaded pallet.

3. The method according to claim 2 wherein the step of disposing disposes one of said plurality of unitary void-filling apparatuses over each loaded pallet, such that every loaded pallet is a covered loaded pallet.

* * * * *